US012451303B1

(12) United States Patent
Huang et al.

(10) Patent No.: US 12,451,303 B1
(45) Date of Patent: Oct. 21, 2025

(54) KEY STRUCTURE

(71) Applicant: Primax Electronics Ltd., Taipei (TW)

(72) Inventors: Yi-Chao Huang, Taipei (TW); Yu-Zeng Yang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 18/987,634

(22) Filed: Dec. 19, 2024

(30) Foreign Application Priority Data

Nov. 15, 2024 (TW) ................................ 113144155

(51) Int. Cl.
*H01H 13/02* (2006.01)
*H01H 13/14* (2006.01)

(52) U.S. Cl.
CPC .......... *H01H 13/023* (2013.01); *H01H 13/14* (2013.01)

(58) Field of Classification Search
CPC ............................ H01H 13/023; H01H 13/14
USPC ...................................................... 362/23.03
See application file for complete search history.

(56) References Cited

U.S. PATENT DOCUMENTS

| | | | | |
|---|---|---|---|---|
| 8,173,922 B2 * | 5/2012 | Chen | H01H 13/83 200/314 |
| 9,214,300 B2 * | 12/2015 | Chen | H01H 13/83 |
| 2014/0166457 A1 * | 6/2014 | Chen | H01H 13/83 200/5 A |
| 2023/0197372 A1 * | 6/2023 | Yang | H01H 13/7073 200/344 |
| 2025/0093570 A1 * | 3/2025 | Pan | G02B 6/0021 |

* cited by examiner

*Primary Examiner* — Laura K Tso
(74) *Attorney, Agent, or Firm* — KIRTON McCONKIE; Evan R. Witt

(57) ABSTRACT

A key structure includes a keycap, a backlight module and an elastic element. The keycap includes a first light-transmissible area. The backlight module is located under the keycap. In addition, the backlight module includes a first light-emitting element. The first light-emitting element is misaligned with the first light-transmissible area. The elastic element is arranged between a first light propagation path of the first light-emitting element and the first light-transmissible area. The keycap is permitted to be elastically restored to an original position through the elastic element, and the elastic element is made of an opaque material.

25 Claims, 18 Drawing Sheets

KEY STRUCTURE

FIELD OF THE INVENTION

The present invention relates to an input device, and more particularly to a key structure of a keyboard device.

BACKGROUND OF THE INVENTION

Nowadays, many kinds of keyboards are commercially available. In addition, some of the keyboards are equipped with luminous keys. Since the structure of the luminous key is complicated and the space for installing the light-emitting elements is limited, the luminous key is usually equipped with a single light-emitting element. However, as the required functions for users continue to increase, the luminous key no longer has a single function. That is, the same luminous key with dual functions has been introduced into the market.

Consequently, the characters corresponding to various functions have to be displayed on the top surface of the keycap of the luminous key. Furthermore, the luminous key is equipped with at least two light-emitting elements to provide light beams to illuminate the corresponding characters. However, the arrangement of multiple light-emitting elements on the keycap of the luminous key may readily cause the light beams to interference with each other. Under this circumstance, the area-based lighting effect for providing light beams to partitioned zones is usually unsatisfactory.

Therefore, it is important to provide an improved key structure to overcome the drawbacks of the conventional technologies.

SUMMARY OF THE INVENTION

An object of the present invention provides an improved key structure.

The other objects and advantages of the present invention will be understood from the disclosed technical features.

In accordance with an aspect of the present invention, a key structure is provided. The key structure includes a keycap, a backlight module and an elastic element. The keycap includes a first light-transmissible area. The backlight module is located under the keycap. In addition, the backlight module includes a first light-emitting element. The first light-emitting element is misaligned with the first light-transmissible area. The elastic element is arranged between a first light propagation path of the first light-emitting element and the first light-transmissible area. The keycap is permitted to be elastically restored to an original position through the elastic element, and the elastic element is made of an opaque material.

In an embodiment, the elastic element is a dark elastic element or a black elastic element.

In an embodiment, the keycap further includes a second light-transmissible area, and the backlight module further includes a second light-emitting element. The second light-transmissible area is directly located over the first light-emitting element. The second light-emitting element is directly located under the first light-transmissible area.

In an embodiment, the elastic element is arranged between a second light propagation path of the second light-emitting element and the second light-transmissible area.

In an embodiment, the first light-emitting element and the second light-emitting element are top-view light-emitting elements.

In an embodiment, the keycap has a top surface and a bottom surface, and the first light-transmissible area includes a first light channel. The first light channel is in communication with the top surface and the bottom surface of the keycap.

In an embodiment, the first light channel has a first inlet and a first outlet. The first inlet is formed in the bottom surface of the keycap. The first outlet is formed in the top surface of the keycap.

In an embodiment, the key structure further includes a switch layer and a base plate. The switch layer is located over the base plate. The switch layer and the base plate are arranged between the elastic element and the backlight module.

In an embodiment, the switch layer includes at least one opening, and the base plate includes at least one clearance hole. The at least one opening and the at least one clearance hole correspond to the first light-emitting element. The first light-emitting element is accommodated within the at least one opening and the at least one clearance hole.

In an embodiment, the switch layer further includes at least one through-hole, and the base plate includes at least one hook structure. The at least one hook structure is aligned with the at least one through-hole and penetrated through the at least one through-hole.

In an embodiment, the key structure further includes a connecting assembly, and the keycap further includes at least one coupling structure. The connecting assembly is pivotally connected with the at least one coupling structure and the at least one hook structure.

In an embodiment, the elastic element includes a dome top part, a dome bottom part and an inclined wall part. The dome top part is upwardly contacted with the keycap. The dome bottom part has a dome bottom orthographic projection area on the backlight module. The dome bottom orthographic projection area has a diameter. The inclined wall part is connected with the dome top part and the dome bottom part.

In an embodiment, a distance between the first light-emitting element and the dome bottom orthographic projection area is not greater than the diameter of the dome bottom orthographic projection area.

In an embodiment, the elastic element includes a top part, a bottom part and a lateral wall part. The top part is upwardly contacted with the keycap. The top part includes a first surface and a second surface. The first surface and the second surface are opposed to each other. The first surface and the second surface are strip-shaped. The bottom part is located near the backlight module. The lateral wall part is connected with the top part and the bottom part. The keycap has a keycap orthographic projection area on the backlight module. In addition, the keycap orthographic projection area is divided into a first region and a second region by the elastic element.

In an embodiment, the first light-emitting element is included in the first region, and the second light-emitting element is included in the second region.

In accordance with another aspect of the present invention, a key structure is provided. The key structure includes a keycap, a backlight module and an elastic element. The keycap includes a first light-transmissible area, a second light-transmissible area, a third light-transmissible area and a fourth light-transmissible area. The backlight module is located under the keycap. The backlight module includes a first light-emitting element, a second light-emitting element, a third light-emitting element and a fourth light-emitting element. The first light-emitting element corresponds to the first light-transmissible area. The second light-emitting element corresponds to the second light-transmissible area. The third light-emitting element corresponds to the third light-transmissible area. The fourth light-emitting element corresponds to the fourth light-transmissible area. The elastic element is made of an opaque material. The keycap is permitted to be elastically restored to an original position through the elastic element. The keycap has a keycap orthographic projection area on the backlight module. The keycap orthographic projection area is divided into a first region, a second region, a third region and a fourth region by the elastic element. The first light-emitting element is included in the first region. The second light-emitting element is included in the second region. The third light-emitting element is included in the third region. The fourth light-emitting element is included in the fourth region.

In an embodiment, the elastic element includes a central portion, a first extension portion, a second extension portion, a third extension portion and a fourth extension portion. The central portion is arranged between the first light-emitting element, the second light-emitting element, the third light-emitting element and the fourth light-emitting element. The first extension portion is arranged between the first light-emitting element and the second light-emitting element. The second extension portion is arranged between the second light-emitting element and the third light-emitting element. The third extension portion is arranged between the third light-emitting element and the fourth light-emitting element. The fourth extension portion is arranged between the fourth light-emitting element and the first light-emitting element.

In an embodiment, the elastic element is a dark elastic element or a black elastic element.

In an embodiment, the first light-emitting element, the second light-emitting element, the third light-emitting element and the fourth light-emitting element are top-view light-emitting elements.

In an embodiment, the keycap has a top surface and a bottom surface. The top surface and the bottom surface are opposed to each other. The bottom surface is closer to the backlight module than the top surface.

In an embodiment, the first light-transmissible area includes a first light channel, the second light-transmissible area includes a second light channel, the third light-transmissible area includes a third light channel, and the fourth light-transmissible area includes a fourth light channel. The first light channel, the second light channel, the third light channel and the fourth light channel are in communication with the top surface and the bottom surface of the keycap.

In an embodiment, the first light channel has a first inlet and a first outlet, the second light channel has a second inlet and a second outlet, the third light channel has a third inlet and a third outlet, and the fourth light channel has a fourth inlet and a fourth outlet. The first inlet, the second inlet, the third inlet and the fourth inlet are formed in the bottom surface of the keycap. The first outlet, the second outlet, the third outlet and the fourth outlet are formed in the top surface of the keycap.

In an embodiment, the first light-emitting element emits a first light beam to the first light-transmissible area, the second light-emitting element emits a second light beam to the second light-transmissible area, the third light-emitting element emits a third light beam to the third light-transmissible area, and the fourth light-emitting element emits a fourth light beam to the fourth light-transmissible area. The first light beam enters the first light channel through the first inlet and exits from the first outlet. The second light beam enters the second light channel through the second inlet and exits from the second outlet. The third light beam enters the third light channel through the third inlet and exits from the third outlet. The fourth light beam enters the fourth light channel through the fourth inlet and exits from the fourth outlet.

In an embodiment, the key structure further includes a switch layer and a base plate. The switch layer is located over the base plate. The switch layer and the base plate are arranged between the elastic element and the backlight module.

In an embodiment, the switch layer includes at least one opening, and the base plate includes at least one clearance hole. The at least one opening and the at least one clearance hole are in communication with each other. The first light-emitting element, the second light-emitting element, the third light-emitting element and the third light-emitting element are accommodated within the at least one opening and the at least one clearance hole.

In an embodiment, the switch layer further includes at least one through-hole, and the base plate includes at least one hook structure. The at least one hook structure is aligned with the at least one through-hole and penetrated through the at least one through-hole.

In an embodiment, the key structure further includes a connecting assembly, and the keycap further includes at least one coupling structure. The connecting assembly is pivotally connected with the at least one coupling structure and the at least one hook structure.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
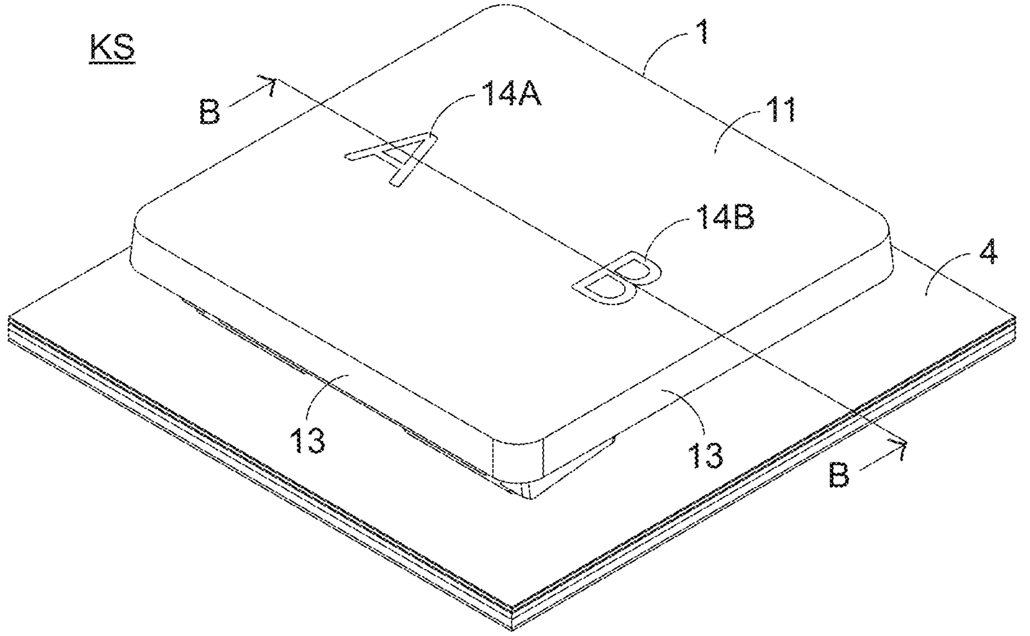
FIG. 1 is a schematic perspective view illustrating the outer appearance of a key structure according to a first embodiment of the present invention.
Figure 2A:
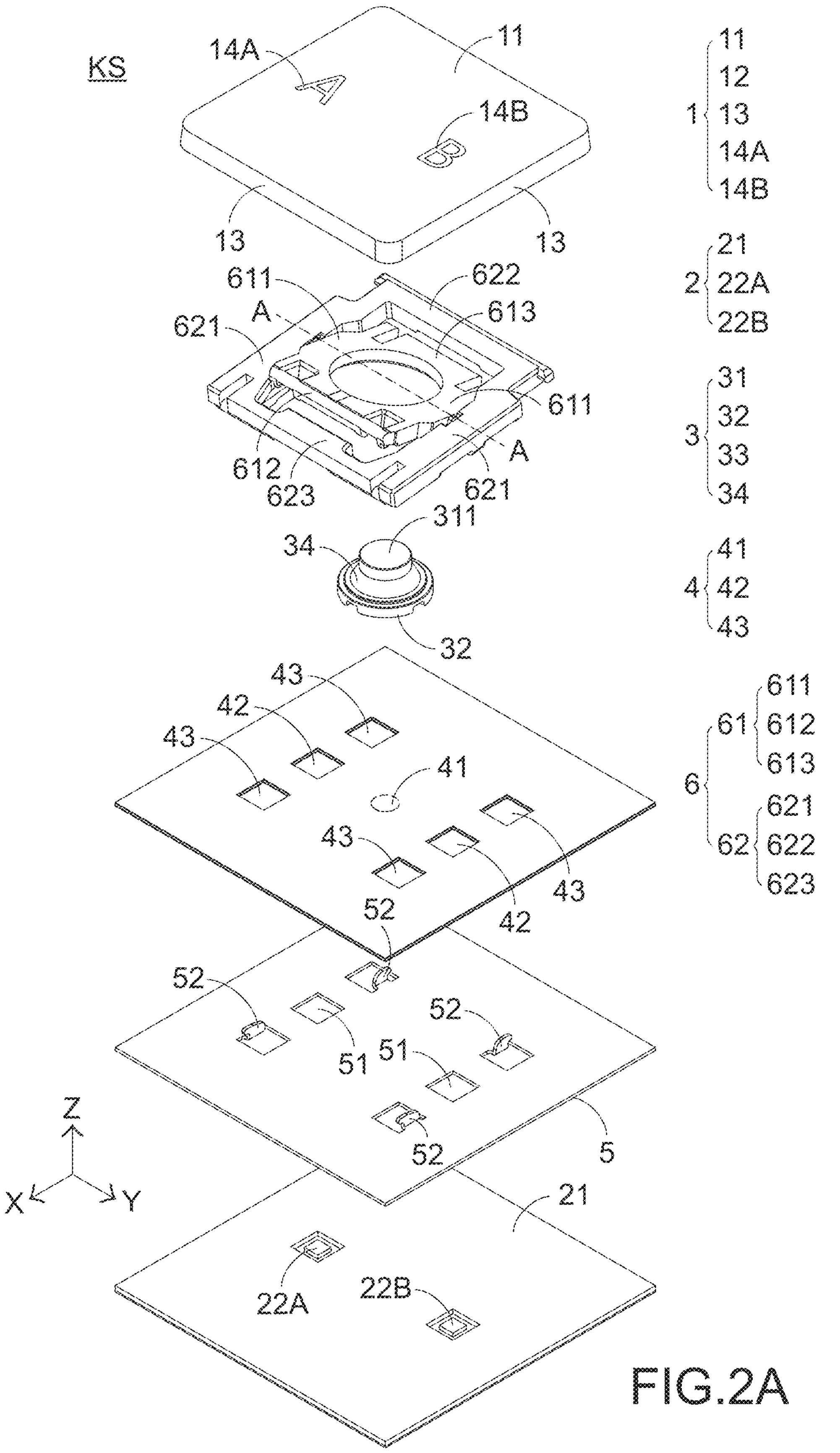
FIG. 2A and FIG. 2B are schematic exploded views illustrating the key structure shown in FIG. 1 and taken along different viewpoints.
Figure 2B:
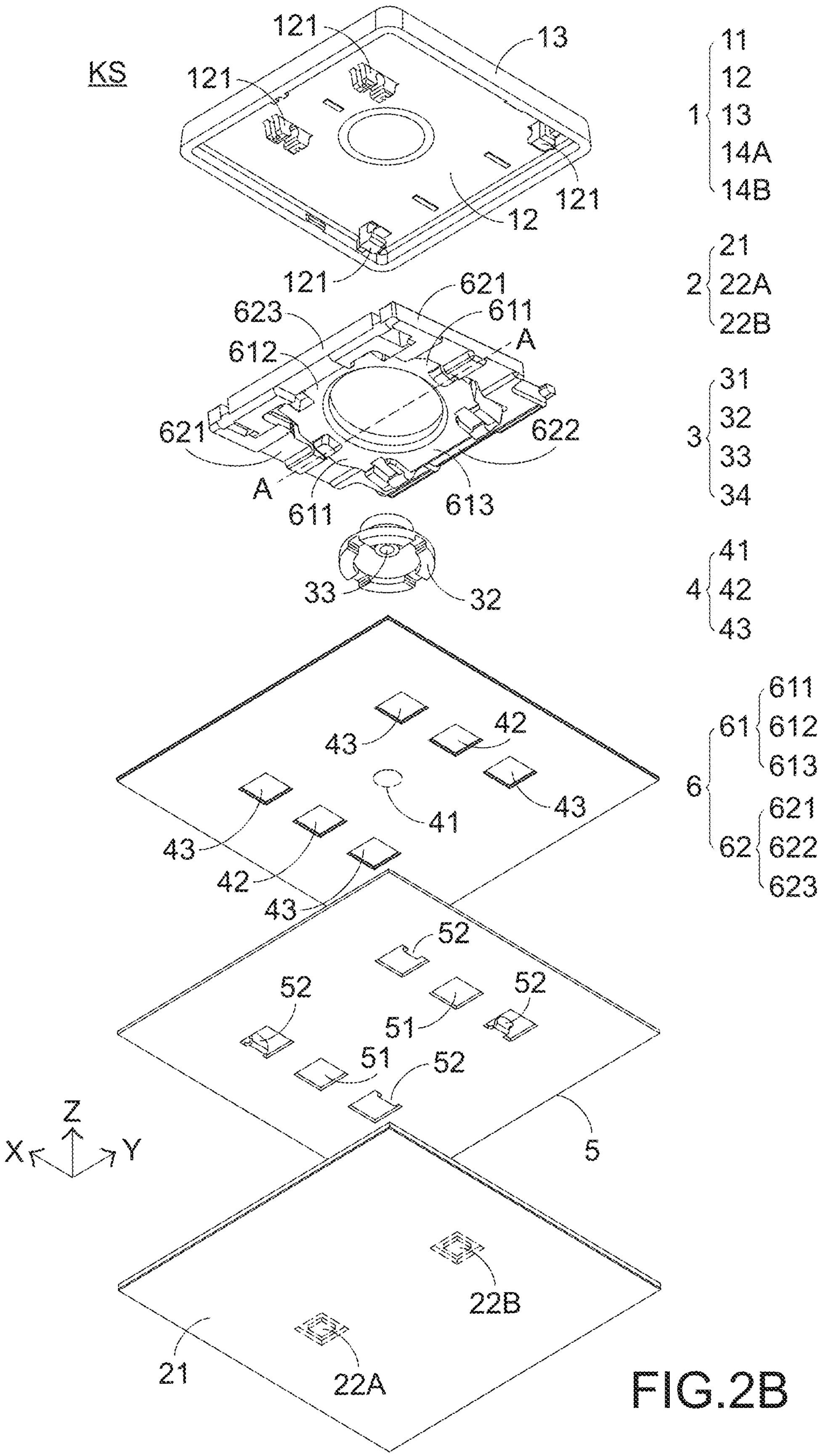
Figure 3:
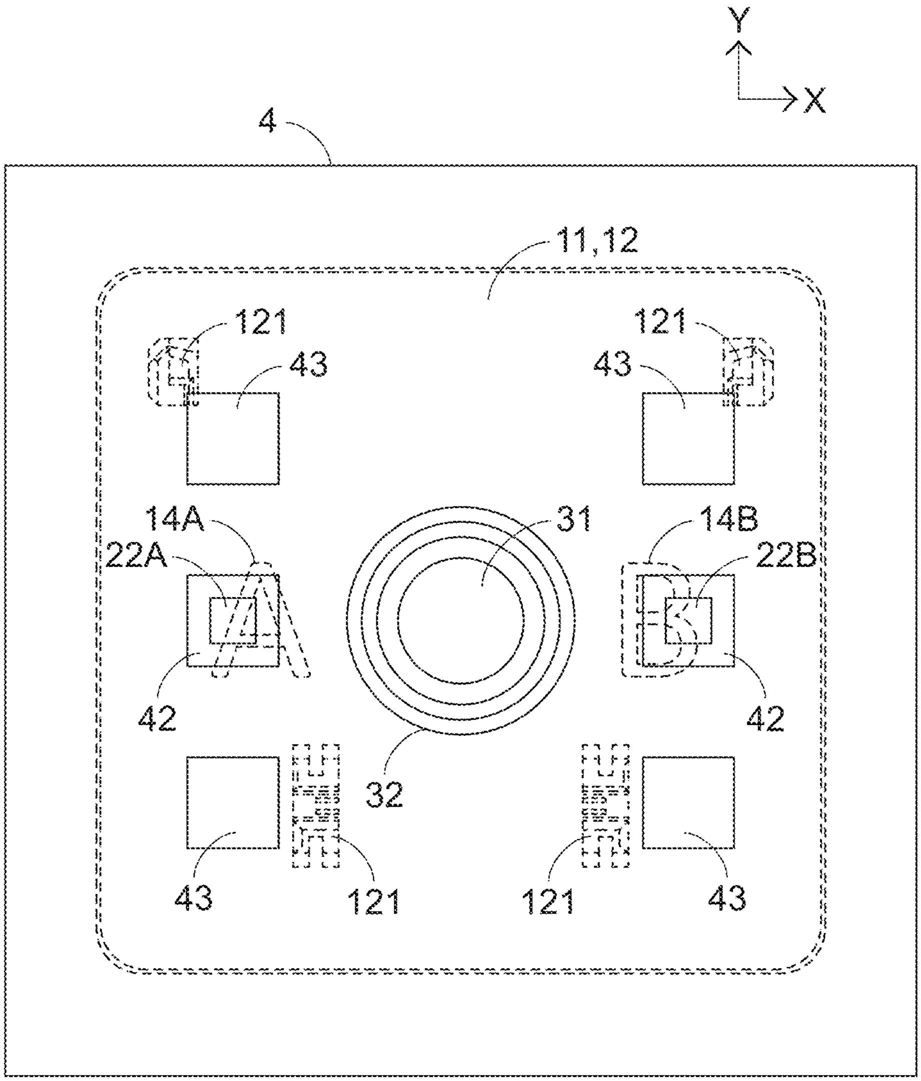
FIG. 3 is a schematic top view illustrating the key structure shown in FIG. 1, in which the connecting assembly is not shown.
Figure 4:
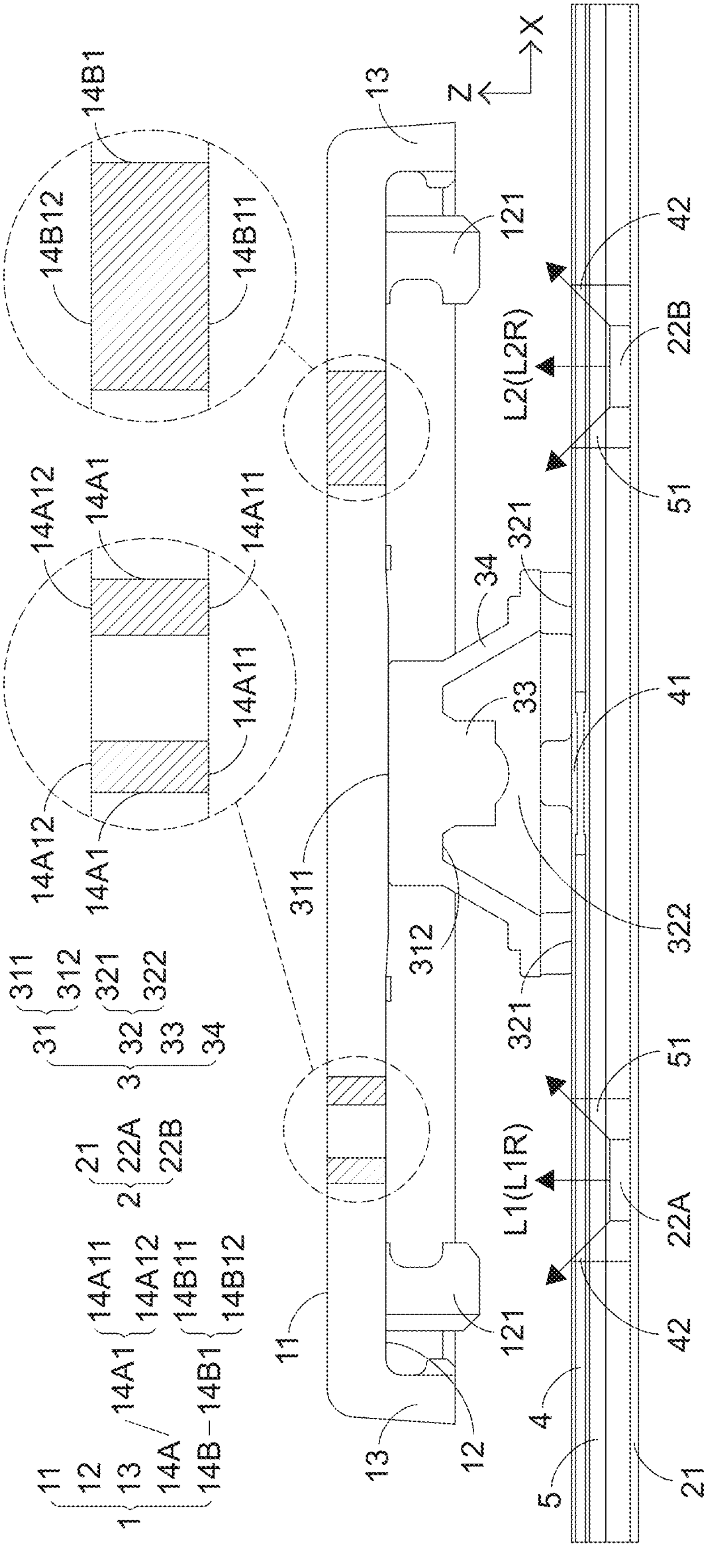
FIG. 4 is a schematic cross-sectional view illustrating the key structure shown in FIG. 1 and taken along the line BB, in which the connecting assembly is not shown.
Figure 5:
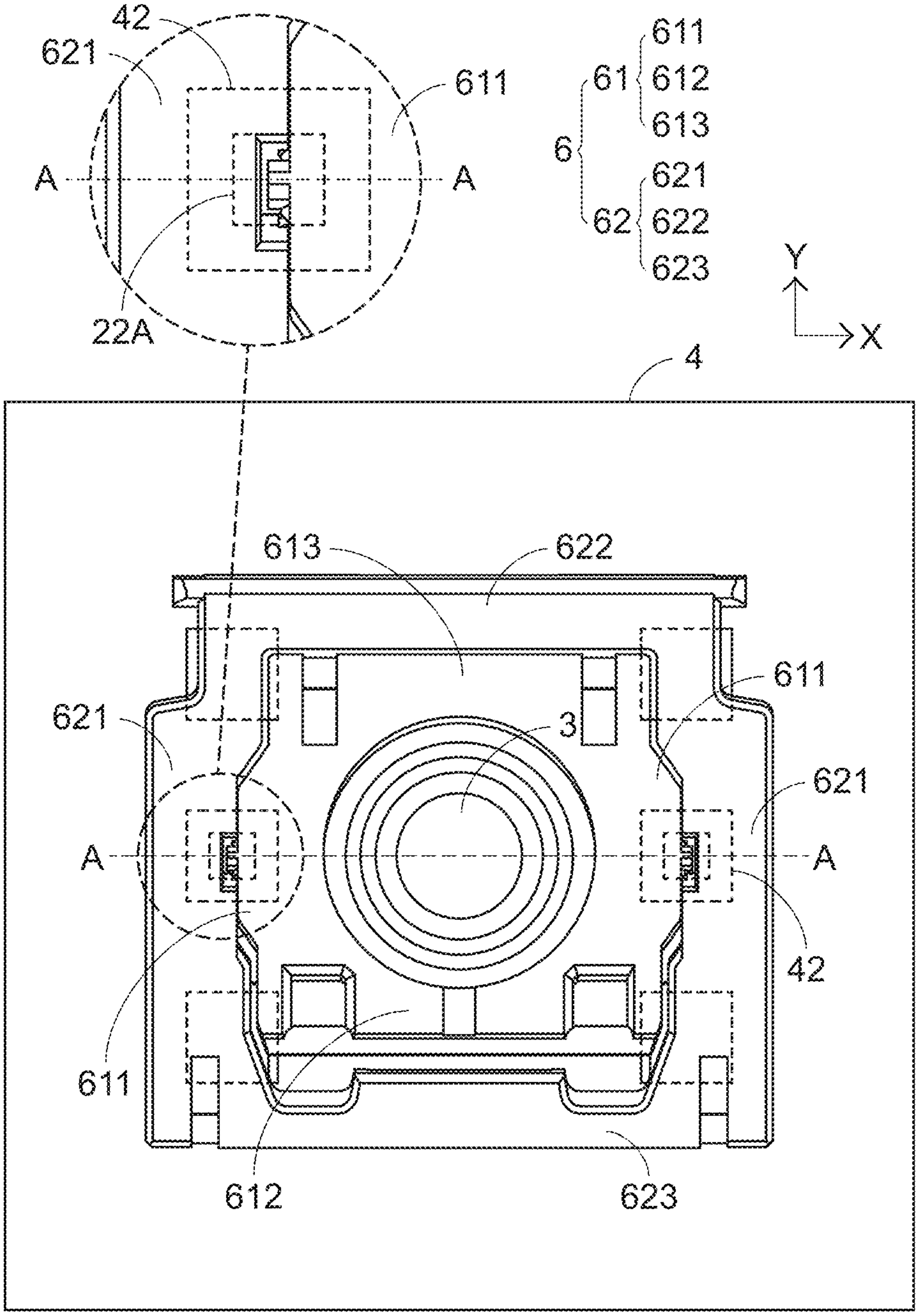
FIG. 5 is a schematic top view illustrating the key structure shown in FIG. 1, in which the keycap is not shown.
Figure 6:
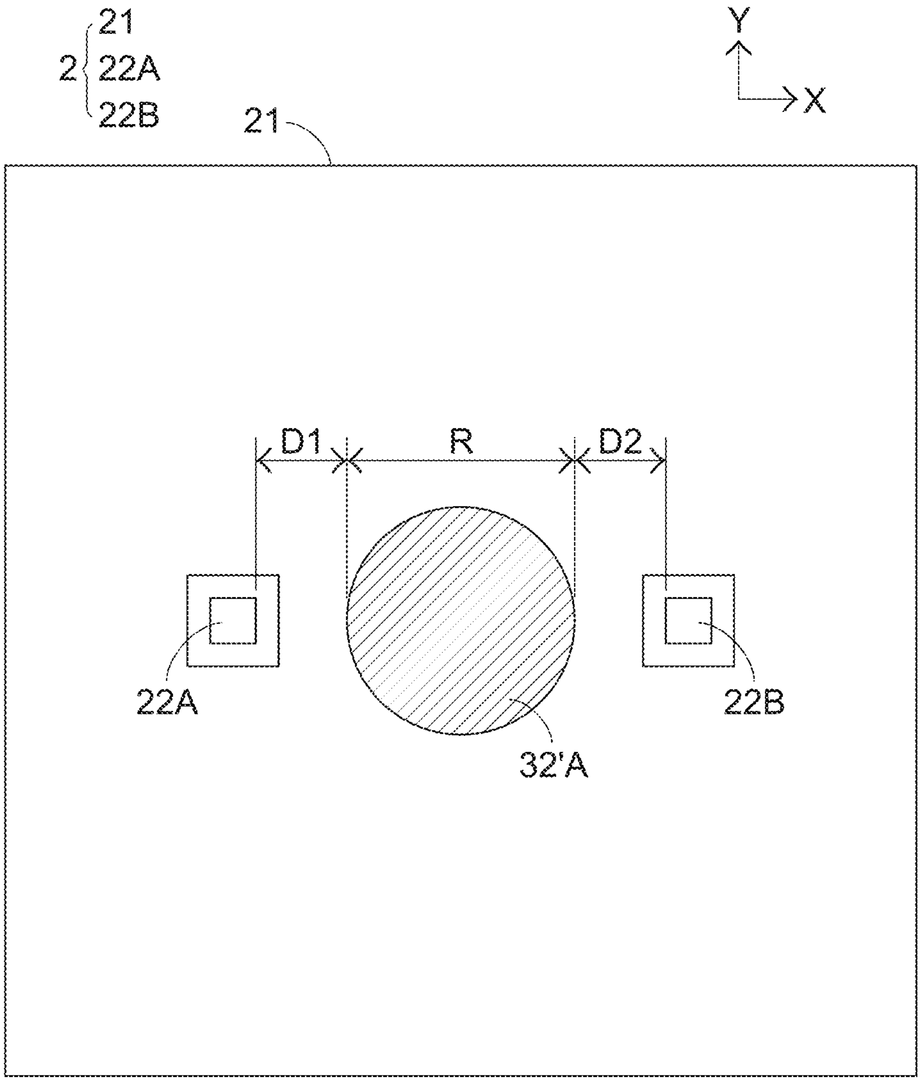
FIG. 6 schematically illustrates a bottom orthographic projection area of the bottom side of the elastic element on the backlight module of the key structure according to the first embodiment of the present invention.

FIG. 1 is a schematic perspective view illustrating the outer appearance of a key structure according to a first embodiment of the present invention. FIG. 2A and FIG. 2B are schematic exploded views illustrating the key structure shown in FIG. 1 and taken along different viewpoints. FIG. 3 is a schematic top view illustrating the key structure shown in FIG. 1, in which the connecting assembly is not shown. FIG. 4 is a schematic cross-sectional view illustrating the key structure shown in FIG. 1 and taken along the line BB, in which the connecting assembly is not shown. FIG. 5 is a schematic top view illustrating the key structure shown in FIG. 1, in which the keycap is not shown. FIG. 6 schematically illustrates a bottom orthographic projection area of the bottom side of the elastic element on the backlight module of the key structure according to the first embodiment of the present invention.

Figure 7A:
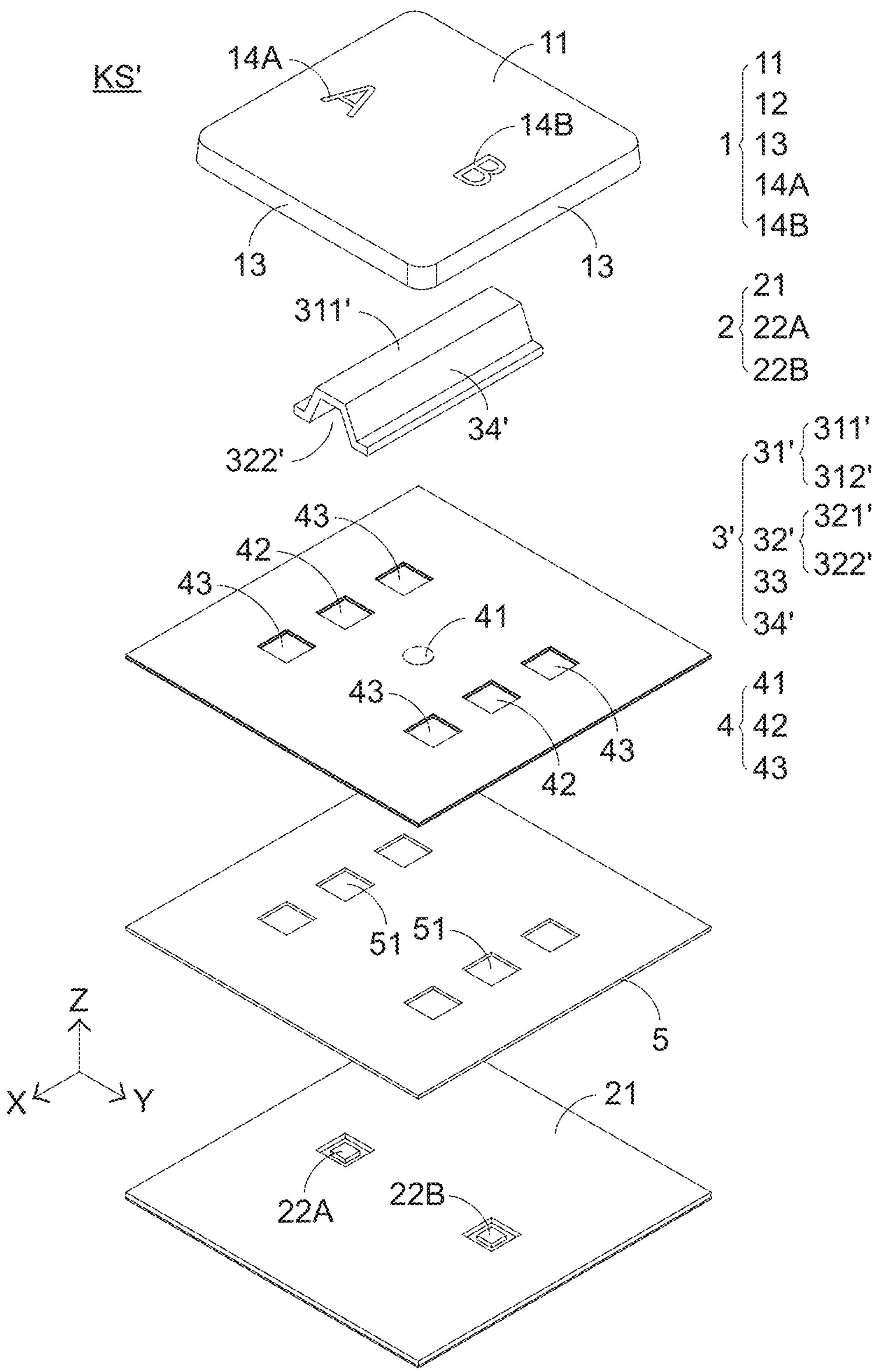
FIG. 7A and FIG. 7B are schematic exploded views illustrating a key structure according to a second embodiment of the present invention, in which the connecting assembly is not shown.
Figure 7B:
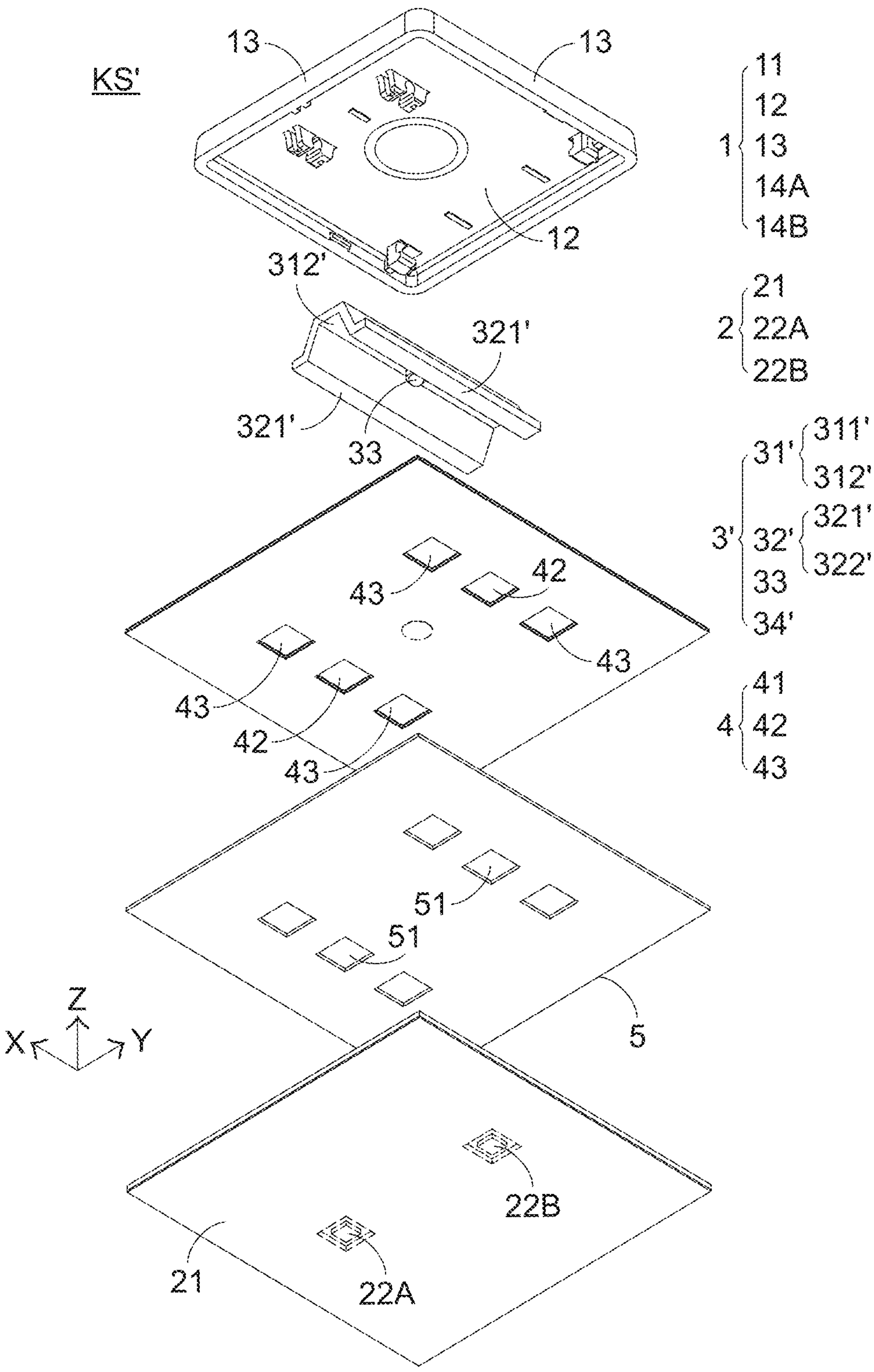
Figure 8:
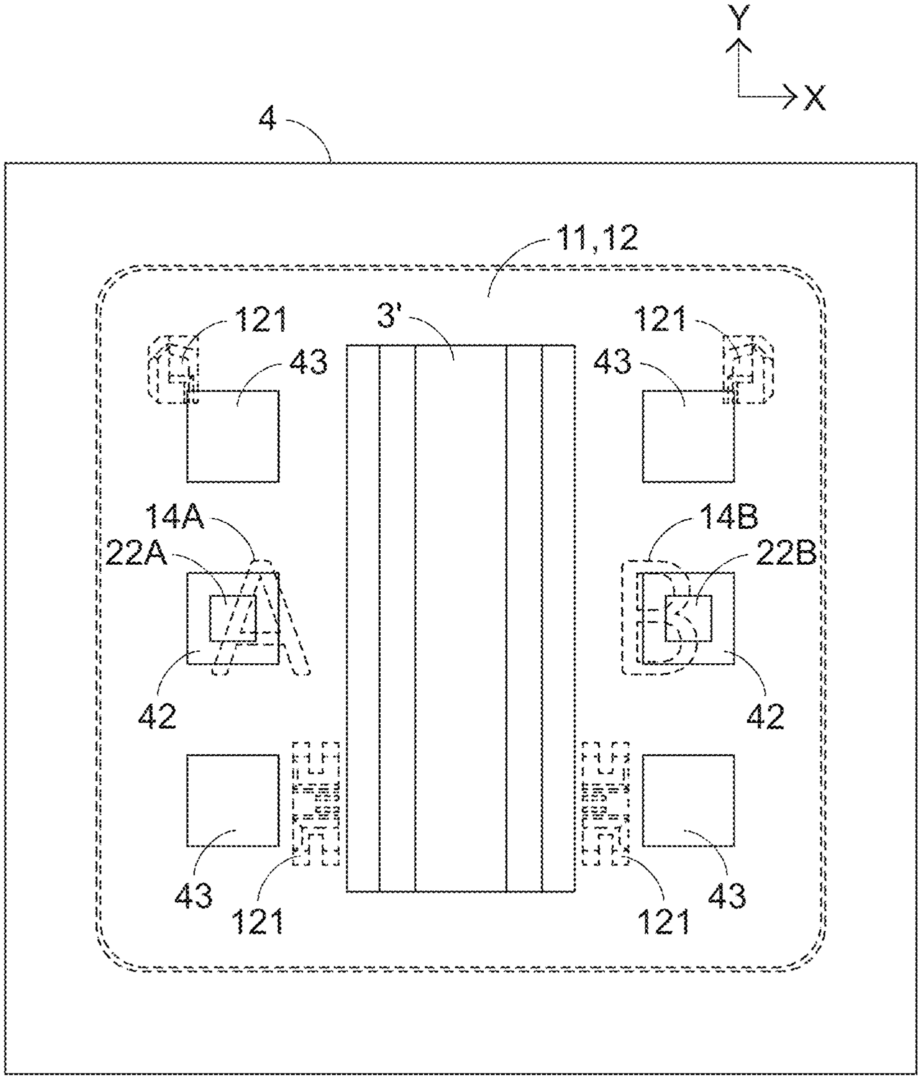
FIG. 8 is a schematic top view illustrating the key structure according to the second embodiment of the present invention, in which the connecting assembly is not shown.
Figure 9:
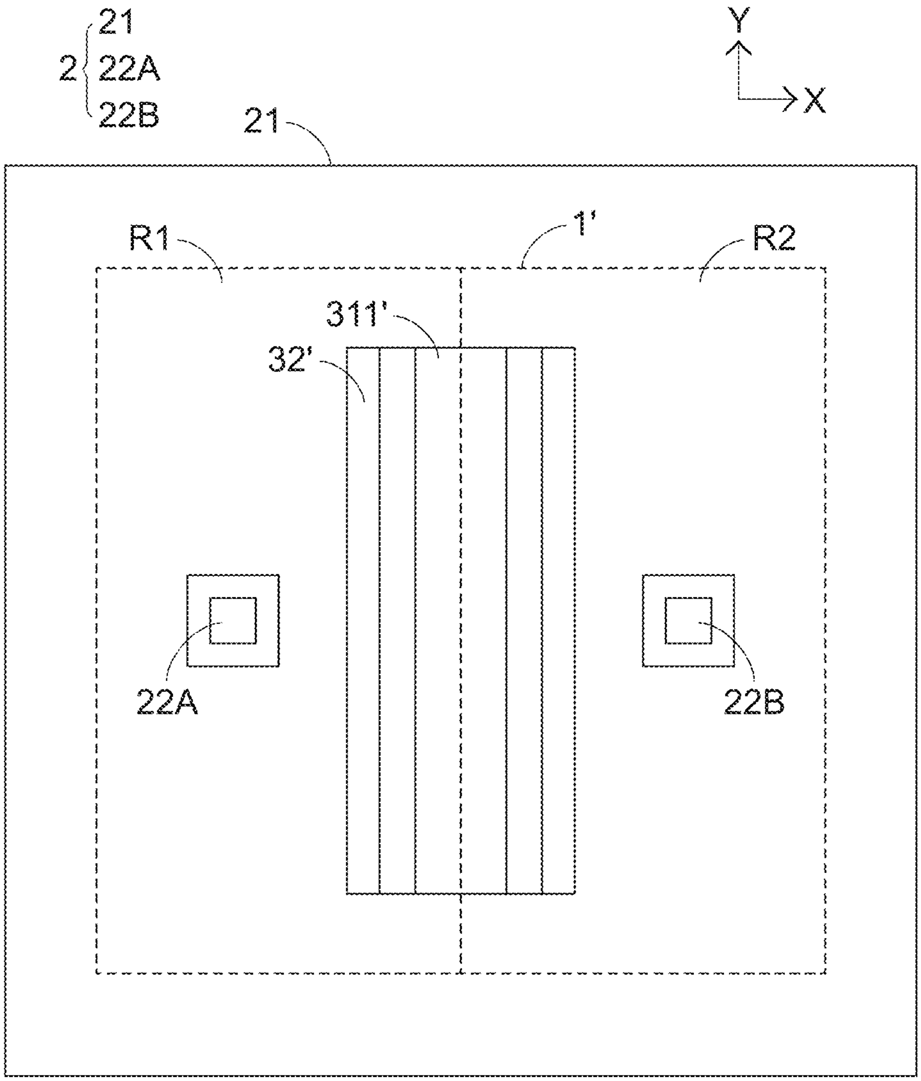
FIG. 9 schematically illustrates a keycap orthographic projection area of the keycap on the backlight module of the key structure according to the second embodiment of the present invention.

FIG. 7A and FIG. 7B are schematic exploded views illustrating a key structure according to a second embodiment of the present invention, in which the connecting assembly is not shown. FIG. 8 is a schematic top view illustrating the key structure according to the second embodiment of the present invention, in which the connecting assembly is not shown. FIG. 9 schematically illustrates a keycap orthographic projection area of the keycap on the backlight module of the key structure according to the second embodiment of the present invention.

Figure 10:
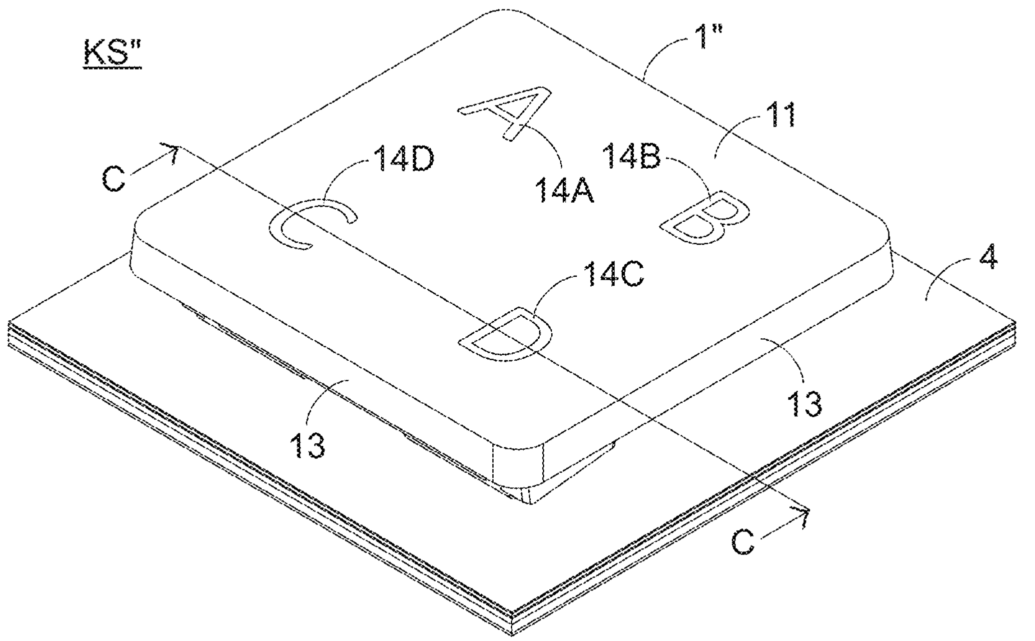
FIG. 10 is a schematic perspective view illustrating the outer appearance of a key structure according to a third embodiment of the present invention.
Figure 11A:
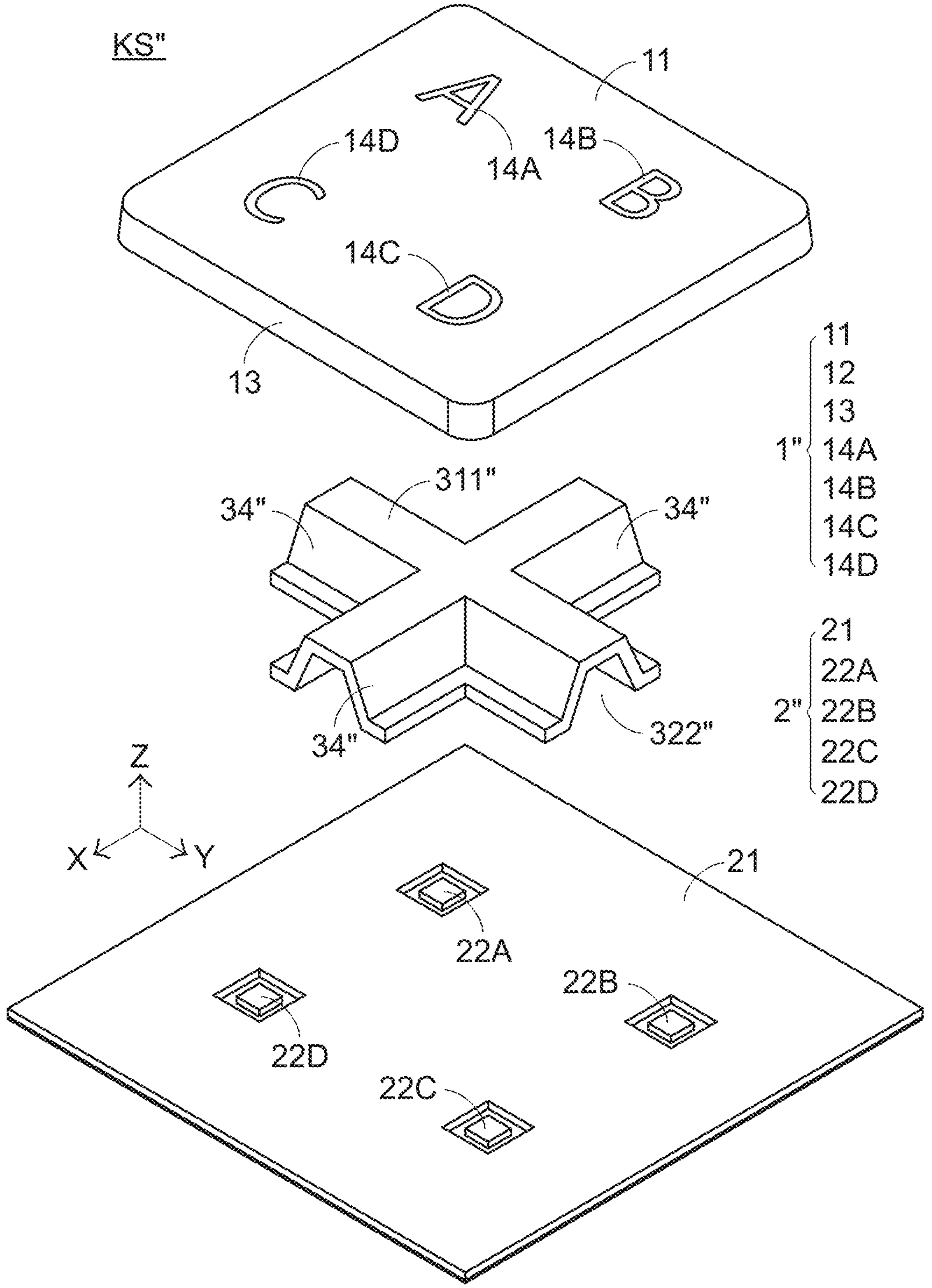
FIG. 11A and FIG. 11B are schematic exploded views illustrating the key structure shown in FIG. 10 and taken along different viewpoints, in which the connecting assembly, the switch layer and the base plate are not shown.
Figure 11B:
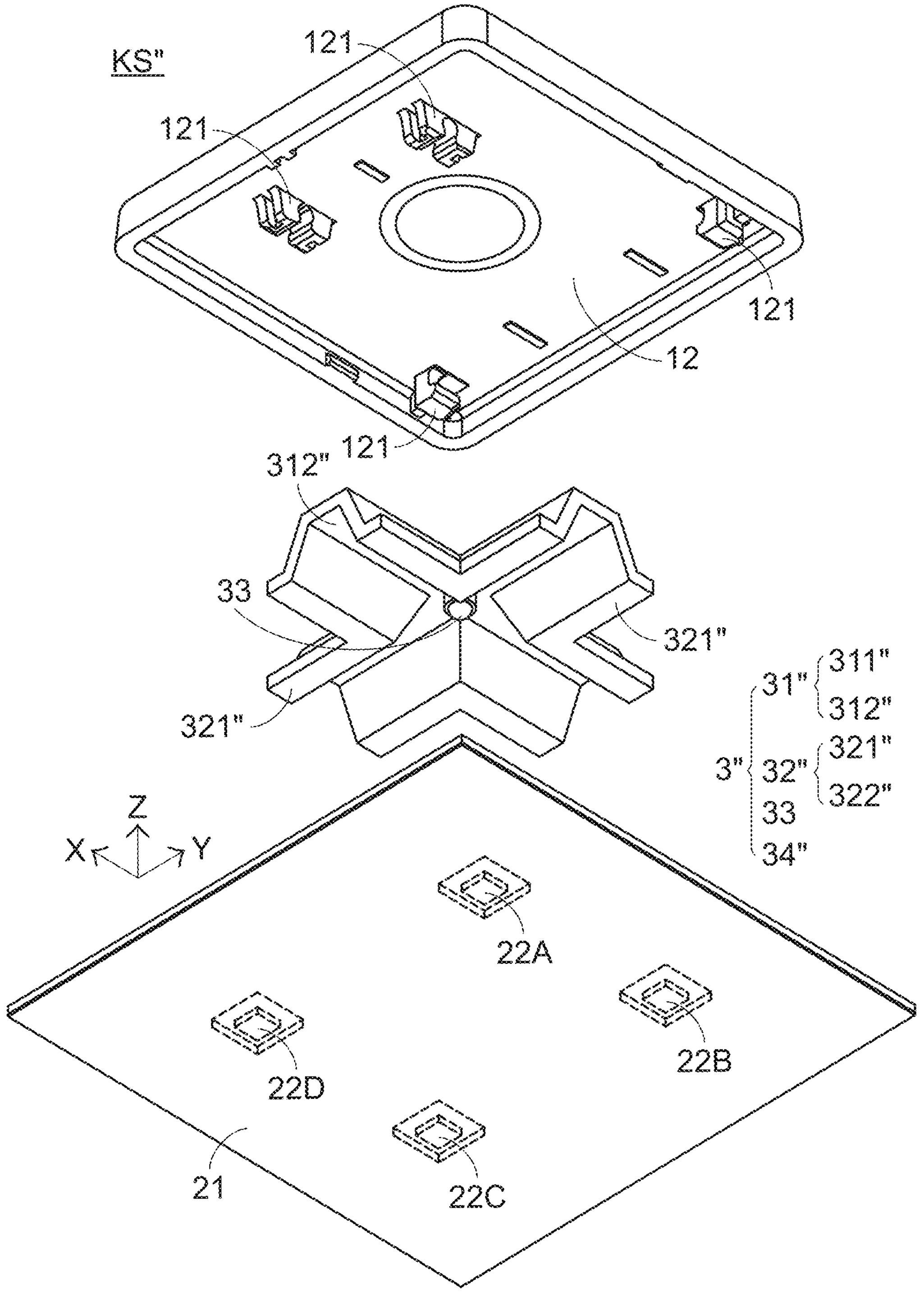
Figure 12:
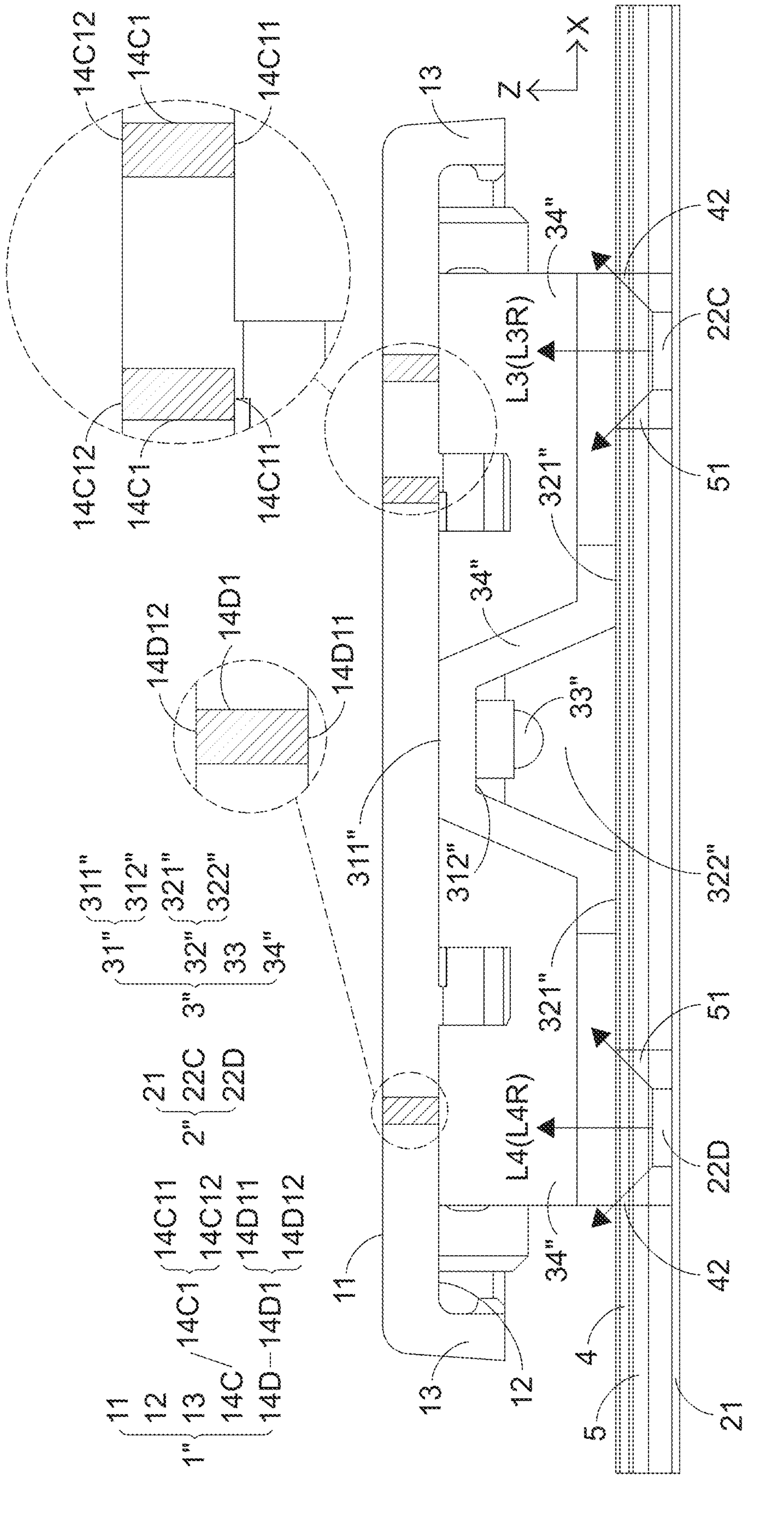
FIG. 12 is a schematic cross-sectional view illustrating the key structure shown in FIG. 10 and taken along the line CC, in which the connecting assembly is not shown.
Figure 13:
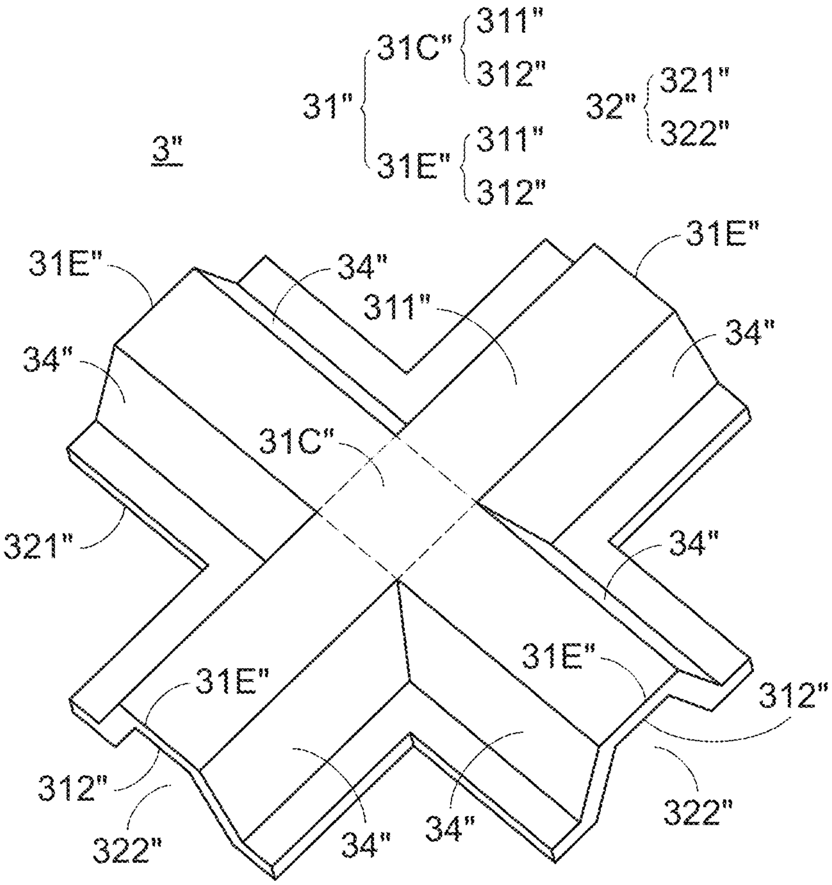
FIG. 13 is a schematic perspective view illustrating the outer appearance of the elastic element in the key structure according to the third embodiment of the present invention.
Figure 14:
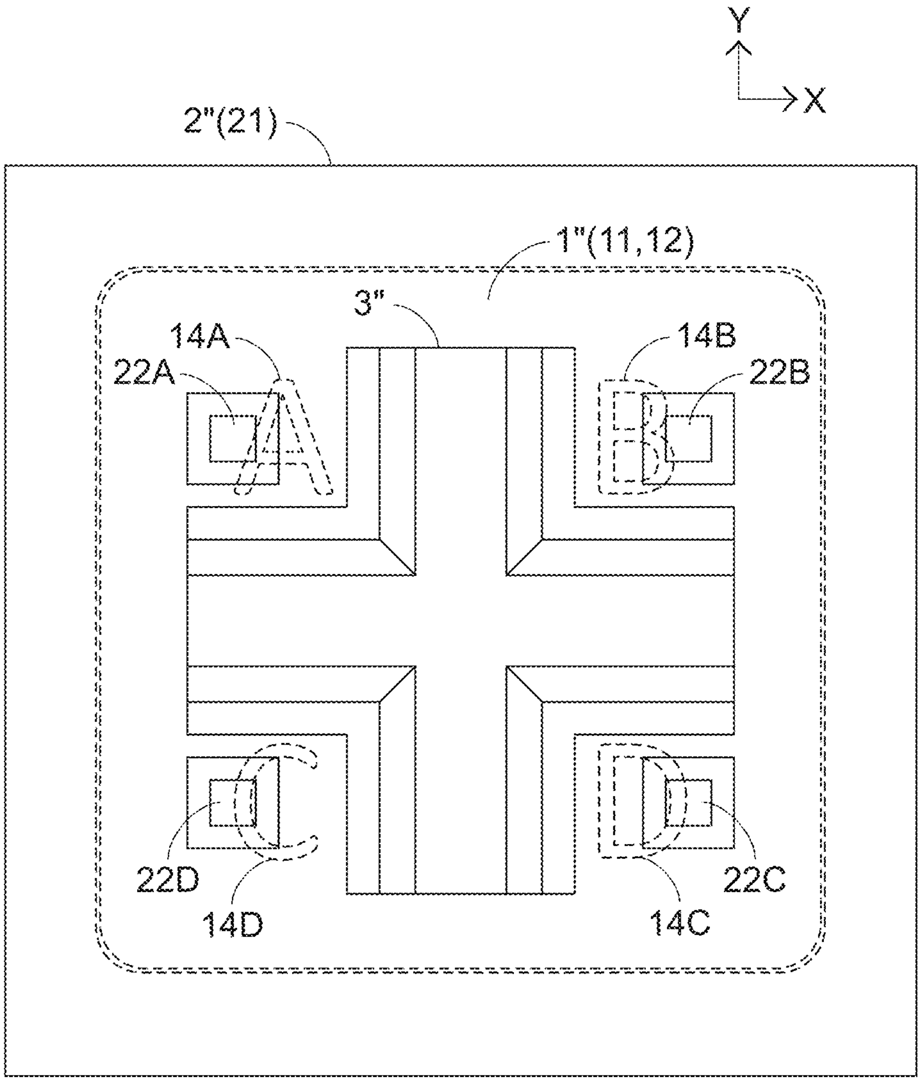
FIG. 14 is a schematic top view illustrating the key structure shown in FIG. 10 according to the third embodiment of the present invention, in which the connecting assembly, the switch layer and the base plate are not shown.
Figure 15:
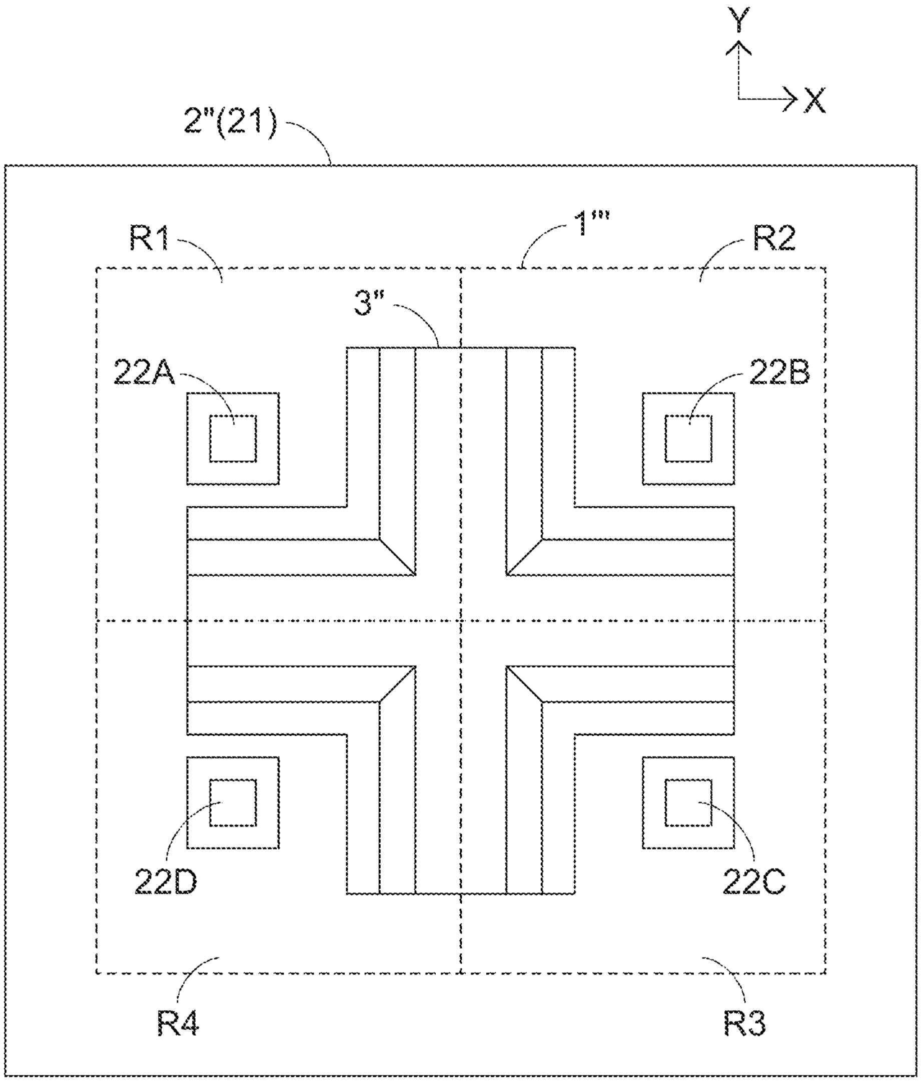
FIG. 15 schematically illustrates a keycap orthographic projection area of the keycap on the backlight module of the key structure according to the third embodiment of the present invention.

FIG. 10 is a schematic perspective view illustrating the outer appearance of a key structure according to a third embodiment of the present invention. FIG. 11A and FIG. 11B are schematic exploded views illustrating the key structure shown in FIG. 10 and taken along different viewpoints, in which the connecting assembly, the switch layer and the base plate are not shown. FIG. 12 is a schematic cross-sectional view illustrating the key structure shown in FIG. 10 and taken along the line CC, in which the connecting assembly is not shown. FIG. 13 is a schematic perspective view illustrating the outer appearance of the elastic element in the key structure according to the third embodiment of the present invention. FIG. 14 is a schematic top view illustrating the key structure shown in FIG. 10 according to the third embodiment of the present invention, in which the connecting assembly, the switch layer and the base plate are not shown. FIG. 15 schematically illustrates a keycap orthographic projection area of the keycap on the backlight module of the key structure according to the third embodiment of the present invention.

Please refer to FIG. 1, FIG. 2A and FIG. 2B. In this embodiment, a key structure KS is provided. The key structure KS includes a keycap 1, a backlight module 2, an elastic element 3, a switch layer 4, a base plate 5 and a connecting assembly 6. In addition, the keycap 1, the elastic element 3, the switch layer 4 and the base plate 5 are stacked on each other from top to bottom. The elastic element 3 is accommodated with an inner space of the connecting assembly 6. As shown in FIG. 4, the top end and the bottom end of the elastic element 3 are respectively contacted with the keycap 1 and switch layer 4. Preferably but not exclusively, the key structure is applied to a character key, a function key, a single key, a multiple key, or any other appropriate key. The components of the key structure KS will be illustrated in more detail as follows.

Please refer to FIG. 4. The keycap 1 includes a top surface 11, a bottom surface 12, a cap rim 13, a first light-transmissible area 14A and a second light-transmissible area 14B. The top surface 11 and the bottom surface 12 are opposed to each other. The top surface 11 of the keycap 1 can be pressed by the user. In addition, the function or character represented by the key can be identified through the top surface 11 of the keycap 1. Furthermore, a plurality of coupling structures 121 are protruded from the bottom surface 12 of the keycap 1. The cap rim 13 is protruded from the bottom surface 12 of the keycap 1 and extended in a direction away from the top surface 11 of the keycap 1. That is, the cap rim 13 is protruded in the negative direction of the Z-axis. The first light-transmissible area 14A includes a first light channel 14A1. The first light channel 14A1 is in communication with the top surface 11 and the bottom surface 12 of the keycap 1. The first light channel 14A1 has a first inlet 14A11 and a first outlet 14A12. The first inlet 14A11 of the first light channel 14A1 is formed in the bottom surface 12 of the keycap 1. The first outlet 14A12 of the first light channel 14A1 is formed in the top surface 11 of the keycap 1. The second light-transmissible area 14B includes a second light channel 14B1. The second light channel 14B1 is in communication with the top surface 11 and the bottom surface 12 of the keycap 1. The second light channel 14B1 has a second inlet 14B11 and a second outlet 14B12. The second inlet 14B11 of the second light channel 14B1 is formed in the bottom surface 12 of the keycap 1. The second outlet 14B12 of the second light channel 14B1 is formed in the top surface 11 of the keycap 1.

In an embodiment, the main body of the keycap 1 is made of a light-transmissible material. After the light-transmissible material is coated on the main body of the keycap 1 by a spray-coating process or a comparable process, a portion of the light-transmissible material is removed by a laser engraving process. Consequently, the corresponding light-transmissible area is formed. For example, the first light-transmissible area 14A and the second light-transmissible area 14B are formed. The light beam can be transmitted through each light-transmissible area. The light beam is blocked from passing through the unremoved portion of the light-transmissible material. Preferably but not exclusively, each of the first light-transmissible area 14A and the second light-transmissible area 14B has the shape of a phonetic symbol, an English letter, a number or a represented function.

Please refer to FIGS. 2A, 2B, 3 and 4 again. The backlight module 2 is located under the keycap 1 to illuminate the backlight module 2. In an embodiment, the backlight module 2 includes a circuit board 21, a first light-emitting element 22A and a second light-emitting element 22B. The first light-emitting element 22A and the second light-emitting element 22B are installed on the circuit board 21. Furthermore, a driving IC (not shown) is installed on the circuit board 21. The first light-emitting element 22A and the second light-emitting element 22B are electrically connected with the driving IC through electrical traces (not shown). Consequently, the currents flowing through the first light-emitting element 22A and the second light-emitting element 22B and the PWM signals provided to the first light-emitting element 22A and the second light-emitting element 22B can be controlled by the driving IC. In this way, the first light-emitting element 22A emits a first light beam L1, and the second light-emitting element 22B emits a second light beam L2. The first light beam L1 propagates along a first light propagation path L1R. The second light beam L2 propagates along a second light propagation path L2R.

In an embodiment, the location of the first light-emitting element 22A corresponds to the location of the first light-transmissible area 14A. That is, the first light-emitting element 22A is approximately located under the first light-transmissible area 14A. As a consequence, the first light beam L1 generated by the first light-emitting element 22A illuminates the first light-transmissible area 14A. Similarly, the location of the second light-emitting element 22B corresponds to the location of the second light-transmissible area 14B. That is, the second light-emitting element 22B is approximately located under the second light-transmissible area 14B. As a consequence, the second light beam L2 generated by the second light-emitting element 22B illuminates the second light-transmissible area 14B. As mentioned above, the first light-emitting element 22A and the second light-transmissible area 14B are misaligned with each other, and the second light-emitting element 22B and the first light-transmissible area 14A are misaligned with each other. In other words, the first light-emitting element 22A is not directly located under the second light-transmissible area 14B, and the second light-emitting element 22B is not directly located under the first light-transmissible area 14A. It is preferred that the first light-emitting element 22A and the second light-emitting element 22B are top-view light-emitting elements. However, the types of the first light-emitting element 22A and the second light-emitting element 22B are not restricted.

Please refer to FIGS. 2A, 2B, 3 and 4 again. The elastic element 3 is used to elastically restore the keycap 1 to the original position and provide a light-blocking function. The elastic element 3 is arranged between the keycap 1 and the backlight module 2. Furthermore, the elastic element 3 is arranged between the first light propagation path L1R of the first light beam L1 and second light-transmissible area 14B, and the elastic element 3 is also arranged between the second light propagation path L2R of the second light beam L2 and the first light-transmissible area 14A.

The elastic element 3 is made of an opaque material. Preferably but not exclusively, the elastic element 3 has a dark color or a black color. Since the elastic element 3 is made of the opaque material, the light beam will be blocked from passing through the elastic element 3. After the first light beam L1 enters the first light channel 14A1 through the first inlet 14A11, the first light beam L1 exits from the keycap 1 through the first outlet 14A12. Similarly, after the second light beam L2 enters the second light channel 14B1 through the second inlet 14B11, the second light beam L2 exits from the keycap 1 through the second outlet 14B12.

In this embodiment, the elastic element 3 is a rubber dome. The elastic element 3 includes a dome top part 31, a dome bottom part 32, a conductive post 33 and an inclined wall part 34. The dome top part 31 has a first surface 311 and a second surface 312. The first surface 311 and the second surface 312 are circular in appearance. The first surface 311 and the second surface 312 are opposed to each other. In addition, the first surface 311 of the dome top part 31 is upwardly contacted with the bottom surface 12 of the keycap 1. The dome bottom part 32 has a second bottom surface 321 and a hollow portion 322. The second bottom surface 321 of the dome bottom part 32 is downwardly contacted with the switch layer 4. The conductive post 33 is protruded from the second surface 312 of the dome top part 31 and extended in the direction toward the dome bottom part 32. That is, the conductive post 33 is protruded in the negative direction of the Z-axis. The inclined wall part 34 is connected with the dome top part 31 and the dome bottom part 32. When the keycap 1 is pressed down by the user, the keycap 1 will be moved downwardly. Correspondingly, the dome top part 31 and the conductive post 33 are moved downwardly, and the inclined wall part 34 is subjected to deformation. When the conductive post 33 touches a switch 41 of the switch layer 4, the switch 41 of the switch layer 4 is triggered by the conductive post 33.

Please refer to FIGS. 2A, 2B, 3 and 4 again. The switch layer 4 is located under the elastic element 3. In an embodiment, the switch layer 4 includes a switch 41, at least one opening 42 and at least one through-hole 43. The switch 41 is located directly under the conductive post 33, and thus the switch 41 is permitted to be triggered to be the conductive post 33. The at least one opening 42 runs through the switch layer 4. The location of the at least one opening 42 corresponds to the light-emitting elements 22A and 22B of the backlight module 2. In addition, the light-emitting elements 22A and 22B are accommodated within the at least one opening 42. Since the backlight module 2 in this embodiment includes the first light-emitting element 22A and the second light-emitting element 22B, the switch layer 4 includes two openings 42. In addition, the first light-emitting element 22A and the second light-emitting element 22B are respectively accommodated within the two openings 42. It is noted that the number of the at least one opening 42 is not restricted. For example, in another embodiment, the switch layer 4 is equipped with a single opening 42 to accommodate a plurality of light-emitting elements. In this embodiment, the at least one through-hole 43 includes a plurality of through-holes 43. The through-holes 43 run through the switch layer 4. Preferably but not exclusively, the switch layer 4 includes four through-holes 43. Preferably but not exclusively, the switch layer 4 has a multilayered membrane structure.

Please refer to FIGS. 2A, 2B, 3 and 4 again. The base plate 5 is arranged between the switch layer 4 and the backlight module 2. The base plate 5 is used to support the key structure KS support. In other words, the material of the base plate 5 has certain hardness. Preferably but not exclusively, the base plate 5 is made of metallic material or plastic material. The base plate 5 includes a plurality of hook structures 52 and at least a plurality of clearance holes 51. These hook structures 52 are protruded upwardly from the surface of the base plate 5 and penetrated through the corresponding through-holes 43 of the switch layer 4. The hook structures 52 are formed by stamping the main body of the base plate 5. The clearance holes 51 run through the base plate 5. The locations of the clearance holes 51 correspond to the locations of the light-emitting elements of the backlight module 2. In addition, the clearance holes 51 are in communication with the corresponding openings 42 of the switch layer 4. The light-emitting elements are accommodated within the corresponding openings 42 and the corresponding clearance holes 51. In this embodiment, the base plate 5 includes two clearance holes 51. The first light-emitting element 22A and the second light-emitting element 22B are respectively accommodated within the two clearance holes 51.

Please refer to FIG. 5. The keycap 1 and the base plate 5 are connected with each other through the connecting assembly 6. Consequently, the keycap 1 can be moved back and forth relative to the base plate 5 along the Z-axis direction. That is, the keycap 1 can be moved upwardly and downwardly relative to the base plate 5. The connecting assembly 6 includes an inner connecting element 61 and an outer connecting element 62. The inner connecting element 61 is pivotally connected to the inner side of the outer connecting element 62 with respect to the rotation axis direction A. The inner connecting element 61 includes a pair of inner body parts 611, a first connecting part 612 and a second connecting part 613. The pair of inner body parts 611 are respectively connected with the first connecting part 612 and the second connecting part 613. The inner connecting element 61 is connected with the corresponding hook structures 52 of the base plate 5 through the first connecting part 612. The inner connecting element 61 is connected with the corresponding coupling structures 121 on the bottom surface 12 of the keycap 1 through the second connecting part 613. The outer connecting element 62 includes a pair of outer body parts 621, a third connecting part 622 and a fourth connecting part 623. The pair of outer body parts 621 are respectively connected with the third connecting part 622 and the fourth connecting part 623. The outer connecting element 62 is connected with the corresponding hook structures 52 of the base plate 5 through the third connecting part 622. The outer connecting element 62 is connected with the corresponding coupling structures 121 on the bottom surface 12 of the keycap 1 through the fourth connecting part 623.

In an embodiment, the entire of the inner connecting element 61 and the entire of the outer connecting element 62 are made of dark material or black material. That is, the overall inner connecting element 61 and the overall outer connecting element 62 have an opaque color. Due to this design, the light beam will not be refracted or leaked out. In another embodiment, the sites of the inner connecting element 61 and the outer connecting element 62 over the corresponding light-emitting elements 22A and 22B are made of light-transmissible material, and the other portions of the inner connecting element 61 and the outer connecting element 62 are made of dark material or black material. That is, the sites of the inner connecting element 61 and the outer connecting element 62 near the rotation axis are made of light-transmissible material. Since the light beam is not blocked by these sites, the effect of reducing refraction or light leakage can be achieved. In this embodiment, the inner connecting element 61 and the outer connecting element 62 are formed by a double injection molding process, and thus the connecting assembly 6 with the composite material is produced.

Please refer to FIG. 6 again. In this embodiment, the dome bottom part 32 of the elastic element 3 has a dome bottom orthographic projection area 32'A on the backlight module 2. The dome bottom orthographic projection area 32'A has a circular profile. In addition, the dome bottom orthographic projection area 32'A has a diameter R. The straight line distance between the first light-emitting element 22A and the circumference of the dome bottom orthographic projection range 32'A is a first distance D1. The straight line distance between the second light-emitting element 22B and the circumference of the dome bottom orthographic projection range 32'A is a second distance D2. In an embodiment, the first distance D1 is not greater than the diameter R, and the second distance D2 is not greater than the diameter R. The design is advantageous. As mentioned above, the elastic element 3 has the rubber dome structure. If the distance between the first light-emitting element 22A (or the second light-emitting element 22B) and the elastic element 3 is too large, the light-blocking effect will be reduced. Since the straight line distance between the first light-emitting element 22A and the elastic element 3 and the straight line distance between the second light-emitting element 22B and the elastic element 3 are properly adjusted, the light-blocking effect will be enhanced.

Please refer to FIG. 7A and FIG. 7B. FIG. 7A and FIG. 7B are schematic exploded views illustrating the key structure KS' according to the second embodiment of the present invention, in which the connecting assembly is not shown. The structures of the key structure of this embodiment are substantially identical to those of the first embodiment. In comparison with the first embodiment, the structure of the elastic element 3' in this embodiment is distinguished. In this embodiment, the elastic element 3' is substantially rectangular in appearance. In this embodiment, the elastic element 3' includes a top part 31', a bottom part 32', a conductive post 33 and a lateral wall part 34'. The top part 31' has a first surface 311' and a second surface 312'. The first surface 311' and the second surface 312' are opposed to each other. The first surface 311' and the second surface 312' have the shapes of elongated strips. For example, the first surface 311' and the second surface 312' are rectangular in appearance. The first surface 311' of the top part 31' is upwardly contacted with the bottom surface 12 of the keycap 1. The bottom part 32' has two second bottom surfaces 321' and a hollow portion 322'. The two second bottom surfaces 321' of the bottom part 32' are downwardly contacted with the switch layer 4. The conductive post 33 is protruded from the second surface 312' of the top part 31' and extended in the direction toward the bottom part 32'. That is, the conductive post 33 is protruded in the negative direction of the Z-axis. The lateral wall part 34' is connected with the top part 31' and the bottom part 32'.

Please refer to FIG. 8 and FIG. 9. In this embodiment, the keycap 1 has a keycap orthographic projection area 1' on the backlight module 2. The keycap orthographic projection area 1' is substantially divided into a first region R1 and a second region R2 by the elastic element 3'. The first light-emitting element 22A is included in the first region R1. The second light-emitting element 22B is included in the second region R2. In this embodiment, the first light-transmissible area 14A is directly located over the first light-emitting element 22A, and the second light-transmitting region 14B is directly located over the second light-emitting element 22B. Preferably, the area of the first region R1 and the area of the second region R2 are substantially equal.

Please refer to FIG. 10 to FIG. 15. In FIG. 10 to FIG. 15, a key structure KS" according to a third embodiment of the present invention is shown. The structures of the key structure of this embodiment are substantially identical to those of the above two embodiments. In comparison with the above embodiments, the number of light-transmissible areas in the keycap 1", the number of light-emitting element in backlight module 2" and the structure of the elastic element 3" in this embodiment are distinguished.

Please refer to FIG. 10 to FIG. 12. In this embodiment, the keycap 1" further includes a third light-transmissible area 14C and a fourth light-transmissible area 14D. The third light-transmissible area 14C includes a third light channel 14C1. The third light channel 14C1 is in communication with the top surface 11 and the bottom surface 12 of the keycap 1". The third light channel 14C1 has a third inlet 14C11 and a third outlet 14C12. The third inlet 14C11 of the third light channel 14C1 is formed in the bottom surface 12 of the keycap 1". The third outlet 14C12 of the third light channel 14C1 is formed in the top surface 11 of the keycap 1". The fourth light-transmissible area 14D includes a fourth light channel 14D1. The fourth light channel 14D1 is in communication with the top surface 11 and the bottom surface 12 of the keycap 1". The fourth light channel 14D1 has a fourth inlet 14D11 and a fourth outlet 14D12. The fourth inlet 14D11 of the fourth light channel 14D1 is formed in the bottom surface 12 of the keycap 1". The fourth outlet 14D12 of the fourth light channel 14D1 is formed in the top surface 11 of the keycap 1". In this embodiment, the first light-transmissible area 14A, the second light-transmissible area 14B, the third light-transmissible area 14C and the fourth light-transmissible area 14D are respectively located near the four corners of the key cap 1". It is noted that the locations of these light-transmissible areas are not restricted.

Please refer to FIG. 10 to FIG. 12 again. In this embodiment, the backlight module 2" further includes a third light-emitting element 22C and a fourth light-emitting element 22D. The third light-emitting element 22C and the fourth light-emitting element 22D are installed on the circuit board 21. The third light-emitting element 22C and the fourth light-emitting element 22D are electrically connected with the driving IC through the corresponding electrical traces (not shown). Consequently, the currents flowing through the third light-emitting element 22C and the fourth light-emitting element 22D and the PWM signals provided to the third light-emitting element 22C and the fourth light-emitting element 22D can be controlled by the driving IC. In this way, the third light-emitting element 22C emits a third light beam L3, and the fourth light-emitting element 22D emits a fourth light beam L4. Furthermore, the third light beam L3 propagates along a third light propagation path L3R, and the fourth light beam L4 propagates along a fourth light propagation path L4R. In this embodiment, the third light-emitting element 22C is directly located under the first light-transmissible area 14A. Similarly, the fourth light-emitting element 22D is directly located under the fourth light-transmissible area 14D. Preferably but not exclusively, the third light-emitting element 22C and the fourth light-emitting element 22D are top-view light-emitting elements.

Please refer to FIG. 13. In this embodiment, the elastic element 3" includes a top part 31", a bottom part 32", a conductive post 33 and a lateral wall part 34". The top part 31" includes a central portion 31C" and four extension portions 31E". The four extension portions 31E" are extended in the direction away from the central portion 31C". Each of the central portion 31C" and the four extension portions 31E" has a first surface 311" and a second surface 312". The first surface 311" and the second surface 312" are opposed to each other. The first surface 311" and the second surface 312" are cross-shaped or X-shaped in appearance. The first surface 311" of the top part 31" is upwardly contacted with the bottom surface 12 of the keycap 1". The bottom part 32" has plurality of second bottom surfaces 321" and a hollow portion 322". These second bottom surfaces 321" are substantially L-shaped in appearance. The plurality of second bottom surfaces 321" of the bottom part 32" are downwardly contacted with the switch layer 4. The conductive post 33 is protruded from the second surface 312" of the top part 31" near the central portion 31C" and extended in the direction toward the bottom part 32'. That is, the conductive post 33 is protruded in the negative direction of the Z-axis. The lateral wall part 34" is connected with the top part 31" and the bottom part 32".

Please refer to FIG. 14 and FIG. 15. In this embodiment, the keycap 1" has a keycap orthographic projection area 1'" on the backlight module 2". The keycap orthographic projection area 1'" is substantially divided into a first region R1, a second region R2, a third region R3 and a fourth region R4 by the elastic element 3". Preferably, the area of the first region R1, the area of the second region R2, the area of the third region R3 and the area of the fourth region R4 are substantially equal. The first region R1 is located beside the second region R2 and the fourth region R4. The second region R2 is located beside the third region R3 and the first region R1. The third region R3 is located beside the fourth region R4 and the second region R2. The fourth region R4 is located beside the first region R1 and the third region R3. The first region R1 and the third region R3 are arranged oppositely. The second region R2 and the fourth region R4 are arranged oppositely. The first light-emitting element 22A is included in the first region R1. The second light-emitting element 22B is included in the second region R2. The third light-emitting element 22C is included in the third region R3. The fourth light-emitting element 22D is included in the fourth region R4.

In this embodiment, the first light-transmissible area 14A is directly located over the first light-emitting element 22A, the second light-transmitting region 14B is directly located over the second light-emitting element 22B, the third light-transmissible area 14C is directly located over the third light-emitting element 22C, and the fourth light-transmissible area 14D is directly located over the fourth light-emitting element 22D.

From the above descriptions, the present invention provides the key structure. The key structure is equipped with an elastic element made of an opaque material. The elastic element is arranged between the light-emitting element and the light-transmissible area that are misaligned with each other. In addition to the function of elastically restoring the keycap, this elastic element also provides the light blocking function. Due to this structural design, the light beam emitted by the light-emitting element will be concentrated and provided to the corresponding light-transmissible area. Consequently, the key structure provides the area-based lighting effect without any additional structure. In other words, the key structure of the present invention is advantageous over the conventional technologies because it is simplified and is capable of providing the area-based lighting effect.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A key structure, comprising:

a keycap comprising a first light-transmissible area;

a backlight module located under the keycap, and comprising a first light-emitting element, wherein the first light-emitting element is misaligned with the first light-transmissible area;

an elastic element arranged between a first light propagation path of the first light-emitting element and the first light-transmissible area, wherein the keycap is permitted to be elastically restored to an original position through the elastic element, and the elastic element is made of an opaque material;

a switch layer and a base plate, wherein the switch layer is located over the base plate, and the switch layer and the base plate are arranged between the elastic element and the backlight module, wherein the switch layer comprises at least one opening, and the base plate comprises at least one clearance hole, wherein the at least one opening and the at least one clearance hole correspond to the first light-emitting element, and the first light-emitting element is accommodated within the at least one opening and be least one clearance hole.

2. The key structure according to claim 1, wherein the elastic element is a dark elastic element or a black elastic element.

3. The key structure according to claim 1, wherein the keycap further comprises a second light-transmissible area, and the backlight module further comprises a second light-emitting element, wherein the second light-transmissible area is directly located over the first light-emitting element, and the second light-emitting element is directly located under the first light-transmissible area.

4. The key structure according to claim 3, wherein the elastic element is arranged between a second light propagation path of the second light-emitting element and the second light-transmissible area.

5. The key structure according to claim 3, wherein the first light-emitting element and the second light-emitting element are top-view light-emitting elements.

6. The key structure according to claim 1, wherein the keycap has a top surface and a bottom surface, and the first light-transmissible area comprises a first light channel, wherein the first light channel is in communication with the top surface and the bottom surface of the keycap.

7. The key structure according to claim 6, wherein the first light channel has a first inlet and a first outlet, wherein the first inlet is formed in the bottom surface of the keycap, and the first outlet is formed in the top surface of the keycap.

8. The key structure according to claim 1, wherein the switch layer further comprises at least one through-hole, and the base plate comprises at least one hook structure, wherein the at least one hook structure is aligned with the at least one through-hole and penetrated through the at least one through-hole.

9. The key structure according to claim 8, wherein the key structure further comprises a connecting assembly, and the keycap further comprises at least one coupling structure, wherein the connecting assembly is pivotally connected with the at least one coupling structure and the at least one hook structure.

10. The key structure according to claim 1, wherein the elastic element comprises:

a dome top part upwardly contacted with the keycap;

a dome bottom part having a dome bottom orthographic projection area on the backlight module, wherein the dome bottom orthographic projection area has a diameter; and an inclined wall part connected with the dome top part and the dome bottom part.

11. The key structure according to claim 10, wherein a distance between the first light-emitting element and the dome bottom orthographic projection area is not greater than the diameter of the dome bottom orthographic projection area.

12. The key structure according to claim 3, wherein the elastic element comprises:

a top part upwardly contacted with the keycap, and comprising a first surface and a second surface, wherein the first surface and the second surface are opposed to each other, and the first surface and the second surface are strip-shaped;

a bottom part located near the backlight module; and a lateral wall part connected with the top part and the bottom part, wherein the keycap has a keycap orthographic projection area on the backlight module, and the keycap orthographic projection area is divided into a first region and a second region by the elastic element.

13. The key structure according to claim 12, wherein the first light-emitting element is included in the first region, and the second light-emitting element is included in the second region.

14. A key structure, comprising:

a keycap comprising a first light-transmissible area, a second light-transmissible area, a third light-transmissible area and a fourth light-transmissible area;

a backlight module located under the keycap, and comprising a first light-emitting element, a second light-emitting element, a third light-emitting element and a fourth light-emitting element, wherein the first light-emitting element corresponds to the first light-transmissible area, the second light-emitting element corresponds to the second light-transmissible area, the third light-emitting element corresponds to the third light-transmissible area, and the fourth light-emitting element corresponds to the fourth light-transmissible area;

an elastic element made of an opaque material, wherein the keycap is permitted to be elastically restored to an original position through the elastic element; and a switch layer and a base plate, wherein the switch layer is located over the base plate, and the switch layer and the base plate are arranged between the elastic element and the backlight module, wherein the switch layer comprises at least one opening, and the base plate comprises at least one clearance hole, wherein the at least one opening and the at least one clearance hole are in communication with each other, and the first light-emitting element, the second light-emitting element, the third light element and the third light-emitting element are accommodated within the at least one opening and the at least one clearance hole, wherein the keycap has a keycap orthographic projection area on the backlight module, and the keycap orthographic projection area is divided into a first region, a second region, a third region and a fourth region by the elastic element, wherein the first light-emitting element is included in the first region, the second light-emitting element is included in the second region, the third light-emitting element is included in the third region, and the fourth light-emitting element is included in the fourth region.

15. The key structure according to claim 14, wherein the elastic element comprises a central portion, a first extension portion, a second extension portion, a third extension portion and a fourth extension portion, wherein the central portion is arranged between the first light-emitting element, the second light-emitting element, the third light-emitting element and the fourth light-emitting element, the first extension portion is arranged between the first light-emitting element and the second light-emitting element, the second extension portion is arranged between the second light-emitting element and the third light-emitting element, the third extension portion is arranged between the third light-emitting element and the fourth light-emitting element, and the fourth extension portion is arranged between the fourth light-emitting element and the first light-emitting element.

16. The key structure according to claim 14, wherein the elastic element is a dark elastic element or a black elastic element.

17. The key structure according to claim 14, wherein the first light-emitting element, the second light-emitting element, the third light-emitting element and the fourth light-emitting element are top-view light-emitting elements.

18. The key structure according to claim 14, wherein the keycap has a top surface and a bottom surface, wherein the top surface and the bottom surface are opposed to each other, and the bottom surface is closer to the backlight module than the top surface.

19. The key structure according to claim 18, wherein the first light-transmissible area comprises a first light channel, the second light-transmissible area comprises a second light channel, the third light-transmissible area comprises a third light channel, and the fourth light-transmissible area comprises a fourth light channel, wherein the first light channel, the second light channel, the third light channel and the fourth light channel are in communication with the top surface and the bottom surface of the keycap.

20. The key structure according to claim 19, wherein the first light channel has a first inlet and a first outlet, the second light channel has a second inlet and a second outlet, the third light channel has a third inlet and a third outlet, and the fourth light channel has a fourth inlet and a fourth outlet, wherein the first inlet, the second inlet, the third inlet and the fourth inlet are formed in the bottom surface of the keycap, and the first outlet, the second outlet, the third outlet and the fourth outlet are formed in the top surface of the keycap.

21. The key structure according to claim 20, wherein the first light-emitting element emits a first light beam to the first light-transmissible area, the second light-emitting element emits a second light beam to the second light-transmissible area, the third light-emitting element emits a third light beam to the third light-transmissible area, and the fourth light-emitting element emits a fourth light beam to the fourth light-transmissible area, wherein the first light beam enters the first light channel through the first inlet and exits from the first outlet, the second light beam enters the second light channel through the second inlet and exits from the second outlet, the third light beam enters the third light channel through the third inlet and exits from the third outlet, and the fourth light beam enters the fourth light channel through the fourth inlet and exits from the fourth outlet.

22. The key structure according to claim 14, wherein the switch layer further comprises at least one through-hole, and the base plate comprises at least one hook structure, wherein the at least one hook structure is aligned with the at least one through-hole and penetrated through the at least one through-hole.

23. The key structure according to claim 22, wherein the key structure further comprises a connecting assembly, and the keycap further comprises at least one coupling structure, wherein the connecting assembly is pivotally connected with the at least one coupling structure and the at least one hook structure.

24. A key structure, comprising:

a keycap comprising a first light-transmissible area;

a backlight module located under the keycap, and comprising a first light-emitting element, wherein the first light-emitting element is misaligned with the first light-transmissible area;

an elastic element arranged between a first light propagation path of the first light-emitting element and the first light-transmissible area, wherein the keycap is permitted to be elastically restored to an original position through the elastic element, and the elastic element is made of an opaque material, wherein the elastic element comprises:

a top part upwardly contacted with the keycap, and comprising a first surface and a second surface, wherein the first surface and the second surface are opposed to each other, and the first surface and the second surface are strip-shaped;

a bottom part located near the backlight module; and a lateral wall part connected with the top part and the bottom part, wherein the keycap has a keycap orthographic projection area on the backlight module, and the keycap orthographic projection area is divided into a first region and a second region by the elastic element; and a second light-transmissible area, and the backlight module further comprises a second light-emitting element, wherein the second light-transmissible area is directly located over the first light-emitting element, and the second light-emitting element is directly located under the first light-transmissible area.

25. A key structure, comprising:

a keycap comprising a first light-transmissible area, a second light-transmissible area, a third light-transmissible area and a fourth light-transmissible area;

a backlight module located under the keycap, and comprising a first light-emitting element, a second light-emitting element, a third light-emitting element and a fourth light-emitting element, wherein the first light-emitting element corresponds to the first light-transmissible area, the second light-emitting element corresponds to the second light-transmissible area, the third light-emitting element corresponds to the third light-transmissible area, and the fourth light-emitting element corresponds to the fourth light-transmissible area; and an elastic element made of an opaque material, wherein the keycap is permitted to be elastically restored to an original position through the elastic element, wherein the elastic element comprises a central portion, a first extension portion, a second extension portion, a third extension portion and a fourth extension portion, wherein the central portion is arranged between the first light-emitting element, the second light-emitting element, the third light-emitting element and the fourth light-emitting element, the first extension portion is arranged between the first light-emitting element and the second light-emitting element, the second extension portion is arranged between the second light-emitting element and the third light-emitting element, the third extension portion is arranged between the third light-emitting element and the fourth light-emitting element, and the fourth extension portion is arranged between the fourth light-emitting element and the first light-emitting element, wherein the keycap has a keycap orthographic projection area on the backlight module, and the keycap orthographic projection area is divided into a first region, a second region, a third region and a fourth region by the elastic element, wherein the first light-emitting element is included in the first region, the second light-emitting element is included in the second region, the third light-emitting element is included in the third region, and the fourth light-emitting element is included in the fourth region.

* * * * *